April 7, 1936.　　　　E. CARLSON　　　　2,036,920
FRUIT AND VEGETABLE PARING IMPLEMENT
Filed Oct. 27, 1934　　　2 Sheets-Sheet 1
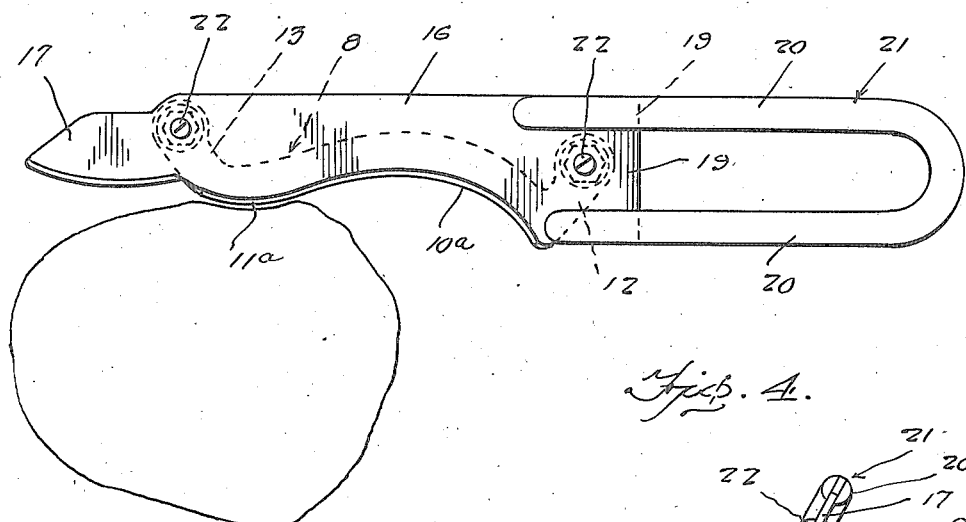
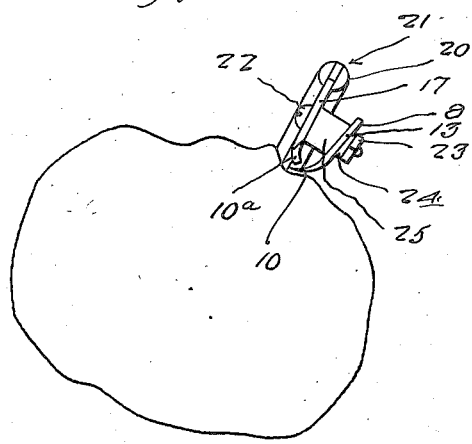
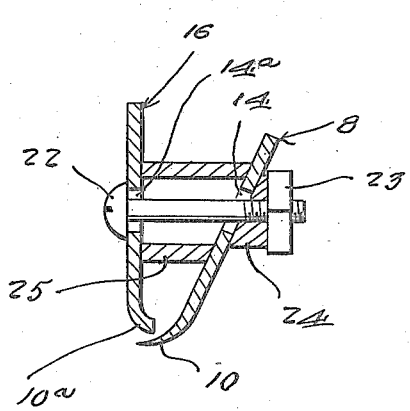
Inventor
E. Carlson
By Clarence A. O'Brien
Attorney April 7, 1936.  E. CARLSON  2,036,920
FRUIT AND VEGETABLE PARING IMPLEMENT
Filed Oct. 27, 1934  2 Sheets-Sheet 2
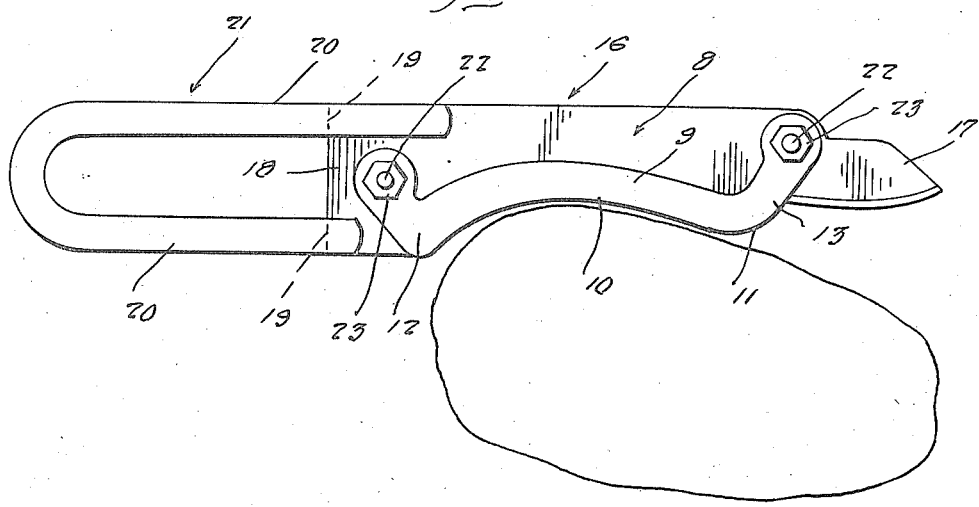
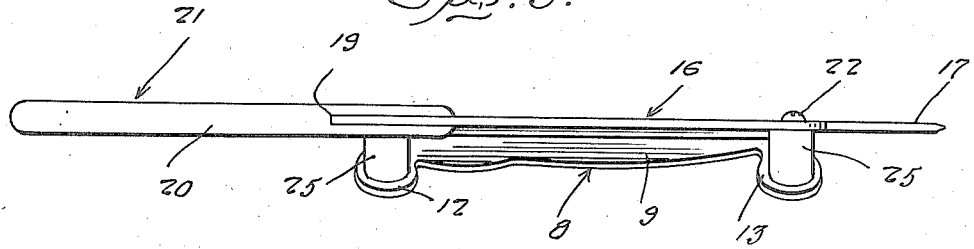
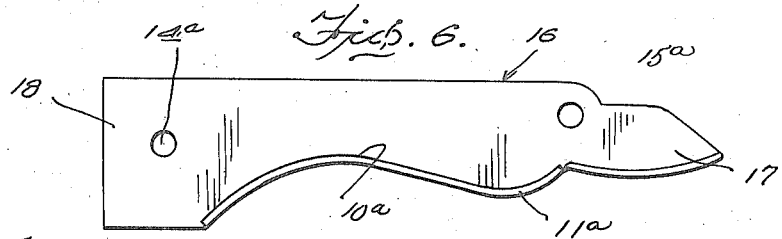
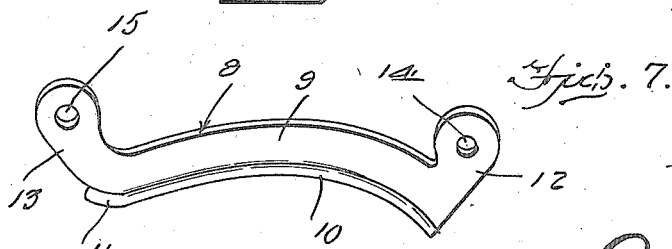
Inventor
E. Carlson
By Clarence A O'Brien
Attorney Patented Apr. 7, 1936

2,036,920

UNITED STATES PATENT OFFICE 2,036,920

FRUIT AND VEGETABLE PARING IMPLEMENT

Emil Carlson, Detroit, Mich.

Application October 27, 1934, Serial No. 750,342

2 Claims. (Cl. 30—20)

This invention relates to that field of prior art embracing tools and implements especially designed and devised for peeling and paring various fruits and vegetables, especially potatoes.

In accordance with the special version of the invention to be herein introduced and explained, I have evolved and produced a simple and economical accessory of the domestic type which resembles a gauge equipped knife but has more specific reference to a new type blade and cutter arrangement fashioned to enable the parts to serve collectively in a manner rendering the device well fitted for the purposes intended and more easily susceptible of regulated usage for peeling the irregular surfaces of potatoes by removing a relatively thin peel in a comparatively uniform manner irrespective of the shape of the product.

Briefly stated, I accomplish what I desire through the instrumentality of a substantially flat blade provided with an appropriate hand grip, said blade having a pointed outer end to facilitate removing the eyes of potatoes, and having a peculiarly shaped and flanged lower portion which constitutes a guard and gauge for cooperation with a somewhat correspondingly shaped adjustable cutting knife.

Being a multiple purpose structure, the invention has to do with a structure which can be adequately regulated to promote efficient and dependable use in a manner which is believed to transcend in expediency and is satisfactorily comparable with similar prior art devices.

Other features and advantages will become more readily apparent from the following description and drawings.

In the drawings:

Figure 1 is a side elevational view observing the depth regulating blade or gauge side of the tool or implement.

Figure 2 is a view looking at the opposite side and disclosing the adjustable position of the relatively shiftable especially designed cutter for paring unit.

Figure 3 is a top plan view of the arrangement depicted in Figure 1.

Figure 4 is an end view showing one way in which the tool may be employed for peeling an irregular surface of a potato.

Figure 5 is a detail transverse or cross sectional view, partly in elevation, showing the angular relationship and adjustment means forming features of importance.

Figures 6 and 7 are details of the blade and cutter units respectively.

Merely as a matter of convenience of description I call attention first to Figure 7 wherein it will be observed that the numeral 8 designates a unit constituting an essential and one of the principal features of the invention. Broadly this may be referred to as a cutter and specifically as a knife. The knife 9 is in the nature of a longitudinally elongated, relatively flat, longitudinally bowed metal strip having a double acting or two way cutting edge. The cutting edge may be divided into two portions, that is the elongated stretch 10 which is of concaved form and the outwardly bowed or convexed relatively short portion 11. These features 10 and 11 define what may be designated as a double curve or serpentine cutter. Obviously, this double acting or sinuous formation allows the cutting edges 11 to be used in a more satisfactorily adaptable manner for clean and uniform paring of potatoes of variegated surface formation. For example, the use of the elongated curve 10 is illustrated in Figure 2, and the short curve in Figure 1. The cutter may, however, be disposed in an axial direction with respect to the longitudinal dimension of the potato or at right angles, that is transverse to the longitudinal dimension as illustrated in Figure 4. The cutting edge is of appropriate taper and sharpness as illustrated, for example, in Figure 5. The ends of the cutter are laterally directed as indicated at 12 and 13 and apertured to form what may be designated as attaching and adjusting ears. These have relatively large bolt holes 14 and 15 for registry with companion bolt holes 14a and 15a formed at the end portions of the gauge blade 16. This gauge blade as shown in Figure 6 comprises a flat plate whose outer end is fashioned to provide a point 17 capable of easily gouging out the eyes of the potato. The butt or inner end 18 of the blade is adapted for reception in accommodation notches 19 formed in the free end portions of the arms 20 of the U-shaped rod-like handle or hand grip 21. That portion of the gauge forming edge of the blade between the openings 14a and 15a, that is inwardly of the point 17, and short of the butt 18 is provided with a two-way curved gauge flange or lip whose portions are differentiated by the numerals 10a and 11a respectively. This allows the features 10, 10a, and 11 and 11a to cooperate in requisite unison. That is to say, these features are properly matched so that the depth of the cut can be regulated and thereby the thinness of the peel controlled more or less I call attention at this time to Figure 5 wherein it will be observed that the cutter or unit 8 occupies a position in converging angular relationship with respect to the substantially straight supporting engaged blade 16. This is accomplished through the instrumentality of connecting bolts 22 equipped with retaining nuts 23 and accompanying stabilizing washers 24. The washers 24 are appropriately shaped so that they have the requisite wedge-shaped formation to securely clamp the cutter 8 and so that the cutting edge extends down below the depth regulating flanges 10a and 11a. The numeral 25, it will be observed, is a bushing or spacing sleeve which is located between the two parts 8 and 16 to dispose them in proper angular relationship. This also controls the slant or inclination of the cutter 8 with respect to the blade 16. The bolt holes are sufficiently large in relationship to the cross sectional proportion of the shank of the bolt 22 to allow these parts 8 and 16 to be shifted either longitudinally or transversely to accomplish the desired results  The results obtainable with this device depends greatly on the skill and experience of the user.  Therefore, it is not practicable to attempt to explain the use of the different gaugings to accomplish various results.

Novelty is predicated on the use of the blade 16 equipped at one end with a handle and at the opposite end with a coring point, said blade being fashioned for cooperation with the inclined cutter 8. The inclination and position of the cutter with respect to the blade is attained through the instrumentality of the spacing sleeves 25 and bolt and nut arrangement depicted in Figure 5. This angular relationship of the parts 8 and 16 wherein the cutting edges 10 and 11 may be regulated with respect to the flanges 10a and 11a is believed to be ingenious. In addition, the two-way formation of the features 10, 10a, 11, and 11a is held to be a satisfactory arrangement which renders the tool adaptable to varying circumstances. That is, this convex and concave formation of the cutting edges and gauge flanges allows the device to be satisfactorily employed as conditions may require.

Additional novelty appears to be reflected in the particular construction of the unit 8 shown in Figure 7, that is, the longitudinally bowed formation of the strip 9 and its attaching ears 12 and 13 which makes it possible for the peelings to pass upwardly between these parts and avoid possible choking and at the same time insures proper depth gauging.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice, if desired.

Having thus described the invention, what is claimed as new is:

1. A device of the class described, comprising a gauge blade provided with an inwardly curved and laterally disposed edge portion, a handle connected to one end of the gauge blade, a knife provided with an inwardly curved and laterally disposed cutting edge and means for connecting the knife to the blade, and supporting the knife in a parallel position to the blade with the cutting edge overlapping under the curved edge of the gauge blade and spaced therefrom.

2. A device of the class described, comprising a gauge blade provided with an inwardly curved and laterally disposed edge portion, a handle connected to one end of the gauge blade, a knife provided with an inwardly curved and laterally disposed cutting edge and means for connecting the knife to the blade, and supporting the knife in a parallel position to the blade with the cutting edge overlapping under the curved edge of the gauge blade and spaced therefrom, and such means including spacer sleeves having one end straight and contacting the blade and its other end beveled and contacting the knife, bolts passing through the blade and knife through the sleeves, said knife and blade having holes therein through which the bolts pass, said holes being of greater diameter than the bolts to permit adjustment of the knife relative to the blade.

EMIL CARLSON.